US006397716B1

(12) United States Patent
Garuglieri

(10) Patent No.: US 6,397,716 B1
(45) Date of Patent: *Jun. 4, 2002

(54) BEVEL SAW ANGLE INDICATOR

(75) Inventor: Andrea Garuglieri, Colle Brianza (IT)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,687

(22) Filed: Jan. 19, 2000

Related U.S. Application Data

(63) Continuation of application No. 08/722,452, filed on Oct. 10, 1996, now Pat. No. 6,142,051, which is a continuation of application No. 08/289,597, filed on Aug. 12, 1994, now abandoned.

(30) Foreign Application Priority Data

Aug. 12, 1993 (GB) ............................................ 9316723

(51) Int. Cl.[7] ............................ B27B 5/24; B23D 45/04

(52) U.S. Cl. ........................ 83/471.3; 83/468.3; 83/473; 83/477.2; 83/522.18; 83/581

(58) Field of Search ................................ 83/490, 471.3, 83/473, 581, 522.18, 468.3, 477.2; 33/558.1, 772, 471

(56) References Cited

U.S. PATENT DOCUMENTS

| | | | | | |
|---|---|---|---|---|---|
| 1,446,726 | A | * | 2/1923 | Sloan | 83/471.3 X |
| 2,010,882 | A | * | 8/1935 | Ocenasek | 33/500 |
| 2,543,486 | A | * | 2/1951 | Briskin | 30/376 |
| 3,482,610 | A | * | 12/1969 | Botefuhr | 83/471.3 |
| 4,152,961 | A | * | 5/1979 | Batson | 83/471.3 |
| 4,514,909 | A | * | 5/1985 | Gilbert | 33/471 |
| 4,531,441 | A | * | 7/1985 | Bergler | 83/471.3 |
| 4,934,233 | A | * | 6/1990 | Brundage et al. | 83/468.3 X |
| 5,239,906 | A | * | 8/1993 | Garuglieri | 83/471.3 |
| 5,437,319 | A | * | 8/1995 | Garuglieri | 83/471.3 X |
| 6,142,051 | A | * | 11/2000 | Garuglieri | 83/471.3 |

* cited by examiner

*Primary Examiner*—Charles Goodman
(74) *Attorney, Agent, or Firm*—Adan Ayala

(57) ABSTRACT

A bevel angle indicator for a saw is disclosed. The saw 10 consists of a table 16, a pivot support 26 pivotally mounted with respect to the table 16 about a bevel axis 92 and a mechanical saw blade pivotally mounted with respect to the pivot support 26 about a second axis 28. The pivot support 26 pivots on a pivot block 27 attached to the table 16. A gearing mechanism couples the pivot block 27 and the pivot support 26 to a dial which indicates the angle between the surface of the table 16 and the plane of the saw blade. The gearing mechanism comprises a rack 50 attached to the pivot block 27 and a pinion 54 rotatably journalled in the pivot support 26. Adjustment of the bevel angle of the saw 10 causes the pinion 54 to advance along the rack 50 and therefore rotate relative to the pivot support 26. The pinion 54 is attached to a sleeve 52, the free end of which carries a pointer 56; the pivot support 26 carries a scale 58. The pointer 56 and scale 58 indicate with accuracy the current bevel angle of the saw.

14 Claims, 3 Drawing Sheets

BEVEL SAW ANGLE INDICATOR

This is a continuation of pending application Ser. No. 08/722,452, filed Oct. 10, 1996, now U.S. Pat. No. 6,142,051 which is a continuation of prior application Ser. No. 08/289,597, filed Aug. 12, 1994, now abandoned.

BACKGROUND OF THE INVENTION

This invention relates to chop saws and particularly to a combination chop and table saw, otherwise known as a flip-over saw. In particular, the invention relates to such a saw which is capable of making bevel cuts in both its table saw mode and mitre saw mode. Such a saw is described in U.S. Pat. No. 4,531,441.

Combination chop and table saws commonly consist of a table, to which is affixed a pivot block, and a pivot support pivotable relative to the pivot block about a horizontal axis. This horizontal axis is the bevel axis of the saw. The pivot support carries the saw assembly including the mechanical saw blade. It is commonplace for there to be some kind of latch arrangement between the pivot block and the pivot support, such that the two will latch together at a number of commonly used angular positions, for example with the saw blade at 15 degrees, 22.5 degrees, 30 degrees or 45 degrees from the vertical. Such latch arrangement is normally provided with a scale which is visible from the front of the saw, even though it is at the back of the saw from a user's perspective.

However, with a saw capable of being used in a table mode as well as a chop mode, it is difficult to ascertain the bevel angle in the table mode, since the pivot block and pivot support are then located underneath the table when the table is inverted. Although the scale is now at the front of the saw, it faces away from the user.

BRIEF SUMMARY OF THE INVENTION

It is an object of the present invention to provide a saw in which it is relatively easy to identify the angle which the saw blade makes to the vertical. Accordingly, the invention provides a saw comprising a workpiece support having a first substantially planar surface, a pivot support pivotally mounted with respect to the workpiece support about a first axis, a mechanical saw blade pivotally mounted with respect to the pivot support about a second axis, the first axis being substantially parallel to the surface of the workpiece support and substantially coincident with the plane of the saw blade, the second axis being substantially perpendicular to the first axis and the plane of the saw blade, and a gearing mechanism coupling the workpiece support and the pivot support to a dial such that the dial indicates the angle between the surface of the workpiece support and the plane of the saw blade. The bevel angle of the saw can easily be identified by inspection of the dial.

For ease of construction, it is preferred that the gearing mechanism comprise a rack and pinion. The rack may be carried by a pivot block fixed to the workpiece support and the pinion may be carried by a spindle rotatably journalled in the pivot support. Since, as the bevel angle of the saw is adjusted, the pivot support moves relative to the workpiece support and therefore to the pivot block, such adjustment will cause the pinion to advance along the rack and therefore will cause the spindle to rotate relative to both the pivot block and the pivot support.

Preferably, the dial comprises a pointer and a scale, one of which is attached to the pivot support, the other to one end of the spindle.

So as to make inspection of the dial easy when the saw is being used in its table mode, it is preferred that the dial faces the position where the operator would be standing. Thus, as the workpiece support will normally include a slot to receive the saw blade, it is preferred that the dial be positioned with respect to the pivot support so as to face away from the slot. The invention also provides a saw comprising a frame, a table mounted in the frame and adapted to pivot between two positions of the table in the frame, a pivot block on one side of the table, a pivot support pivotally mounted with respect to the table about a first axis coincident with the plane of the table, a saw assembly mounted on the pivot support and comprising a motor driven saw blade lying in a plane coincident with said first axis, a slot in the table to one side of said pivot block and pivot support, the saw assembly being adapted to move said blade in its plane through said slot, and a gearing mechanism between said pivot block and pivot support coupled with a dial on said other side of said pivot block and pivot support whereby the rotational position of said pivot block to said pivot support about said first axis is indicated.

The gearing mechanism may comprise an arcuate rack and a pinion, the dial being operatively connected to said pinion. Moreover the pivot block is preferably between the slot and pivot support, in which event, the rack is disposed on said pivot block and said pinion is journalled in said pivot support.

Clamp means may clamp said pivot support and pivot block together, and may comprise a releasable bolt received in said pivot support and passing through an arcuate slot in said pivot block, which slot is centred on said first axis, said pinion being journalled on said bolt.

The saw assembly is preferably pivoted on said pivot support about a second axis substantially perpendicular to said plane and first axis.

BRIEF DESCRIPTION OF THE SEVERAL VIEWS OF THE DRAWINGS

The present invention will now be described with reference to the accompanying drawings wherein.

DETAILED DESCRIPTION

Figure 1:
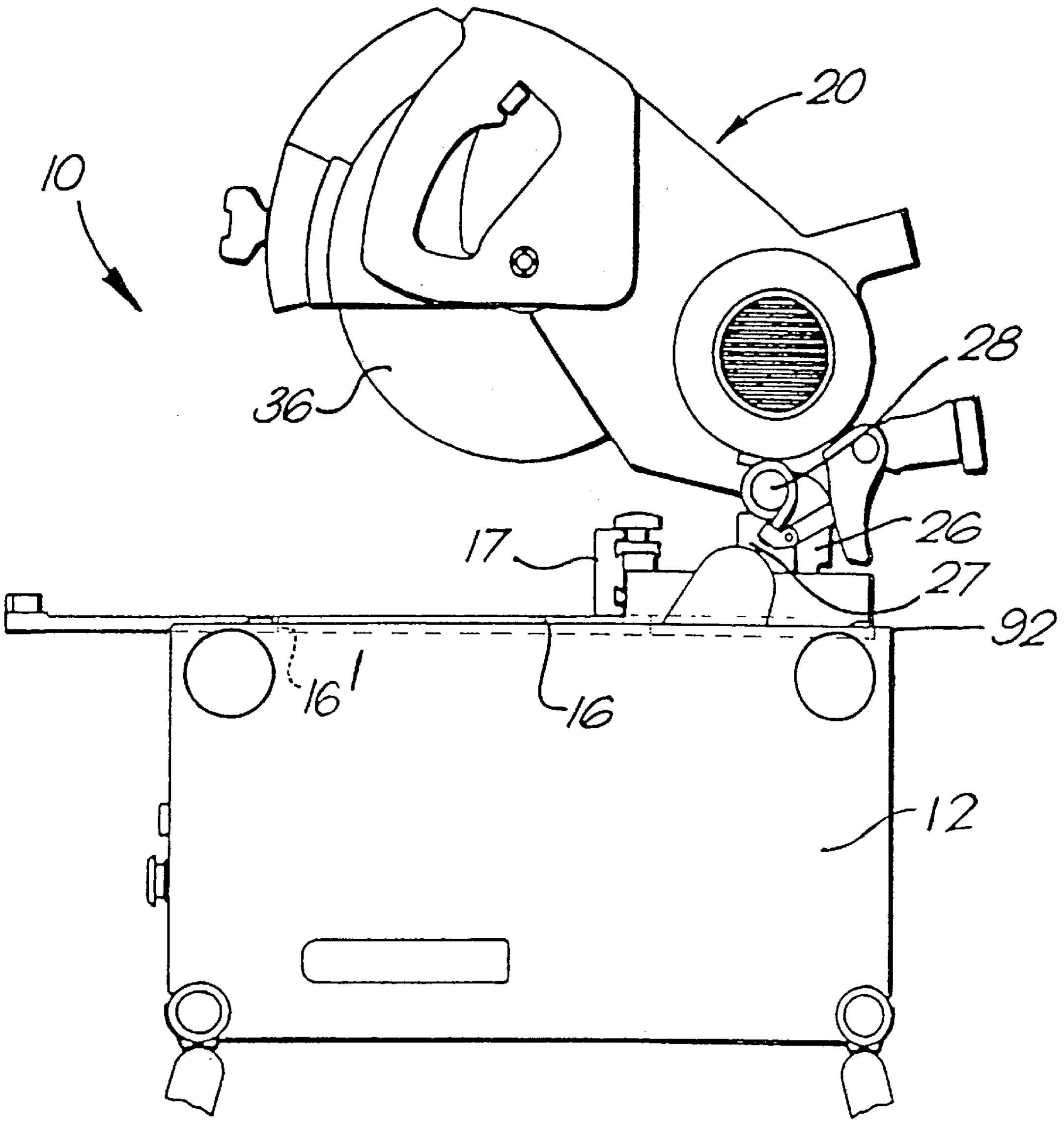
FIG. 1 is a side view of a saw of the type to which the present invention may be applied.

In FIG. 1, a saw 10 consists of a saw assembly 20 mounted on a workpiece support or table 16. The mounting is such as to allow pivotal motion of the saw assembly 20 relative to the table 16 about two spaced, orthogonal axes 28, 92. A pivot support 26 is pivotally mounted on the workpiece support or table 16 about an axis 92 which is parallel to the upper and lower surfaces of the workpiece support 16 and coincident with the plane of the saw blade, in a manner which will be more particularly described below. This axis 92 is the bevel axis of the saw. The saw assembly 20 is itself pivotally mounted on the pivot support 26 about a second axis 28 which is perpendicular both to the first axis 92 and to the plane of the saw blade. Pivoting about the second axis 28 enables the saw assembly 20 to be raised and lowered and allows a saw blade 36 to engage and cut a workpiece supported on the table 16 against a fence 17.

The table 16 is supported in a frame 12 and is arranged to be invertable therein from a mitre saw position as shown in FIG. 1 to a bench saw position (not shown) in which the saw assembly 20 is under the table 16. The table has a slot 16' through which the blade 36 is adapted to protrude in the bench saw position/mode of operation. The system enabling invertion of the saw is preferably as described in our British Patent application No. 9218363.1, although the arrangement described in U.S. Pat. No. 4,531,441 will suffice.

To enable the saw 10 to perform mitre cuts when operating as a chop saw, a circular portion of the table 16 may be made rotatable about a vertical axis with respect to the remainder of the table. The saw assembly 20 rotates with the circular portion (not shown) of the table 16. The fence 17 is fixed in position on the remainder of the table.

Figure 3:
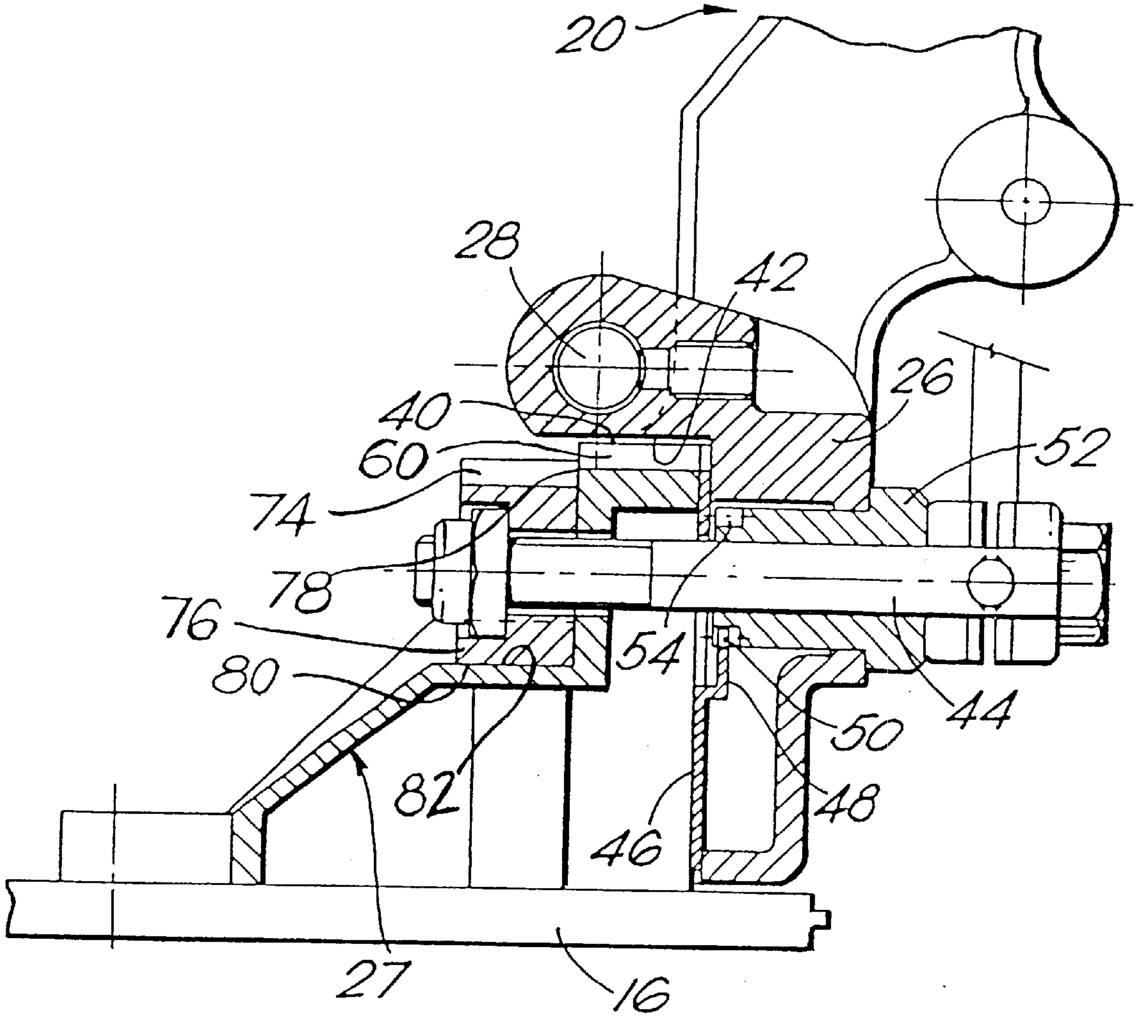
FIG. 3 is a side view of the bevel pivot arrangement.

Pivoting about the first axis 92 enables the saw 10 to make bevel cuts when acting as a mitre saw or when acting as a table saw. The pivot arrangement is more particularly illustrated in FIG. 3.

Affixed to the table 16 is a pivot block 27, the rearmost portion of which is provided with an exterior part-cylindrical surface 40. The pivot support 26 is mounted on the table 16 and pivot block 27 through pivot means (not shown) which constrains the pivot support to pivoting only about axis 92 with respect to the table and pivot block. The surface 40 is centred on the pivot axis 92. A fixing pin 44 extends from the pivot support 26 through an arcuate slot 72 in the pivot block 27. The fixing pin is provided with tightening means which acts to lock the pivot support 26 and pivot block 27 together against relative movement. The fixing pin 44 and fastening means may, for example, be such as is described in our British Patent Application No. 9218366.4.

The rear of the pivot block 27 carries a descending plate 46, a portion 48 of which is press-formed out of alignment with the rest of the plate 46. This portion 48 is part-annular in shape and is provided on its upper surface with a toothed rack 50. Rotatably mounted on the fixing pin 44 is a sleeve 52. The forward end of the sleeve 52 is formed as a toothed pinion 54. The teeth of the pinion 54 cooperate with those of the rack 50, whereby movement of the pivot support 26 relative to the pivot block 27 about the bevel axis 92 causes the pinion 54 to advance along the rack 50 and rotate relative to the fixing pin 44, the pivot support 26 and the pivot block 27.

Figure 2:
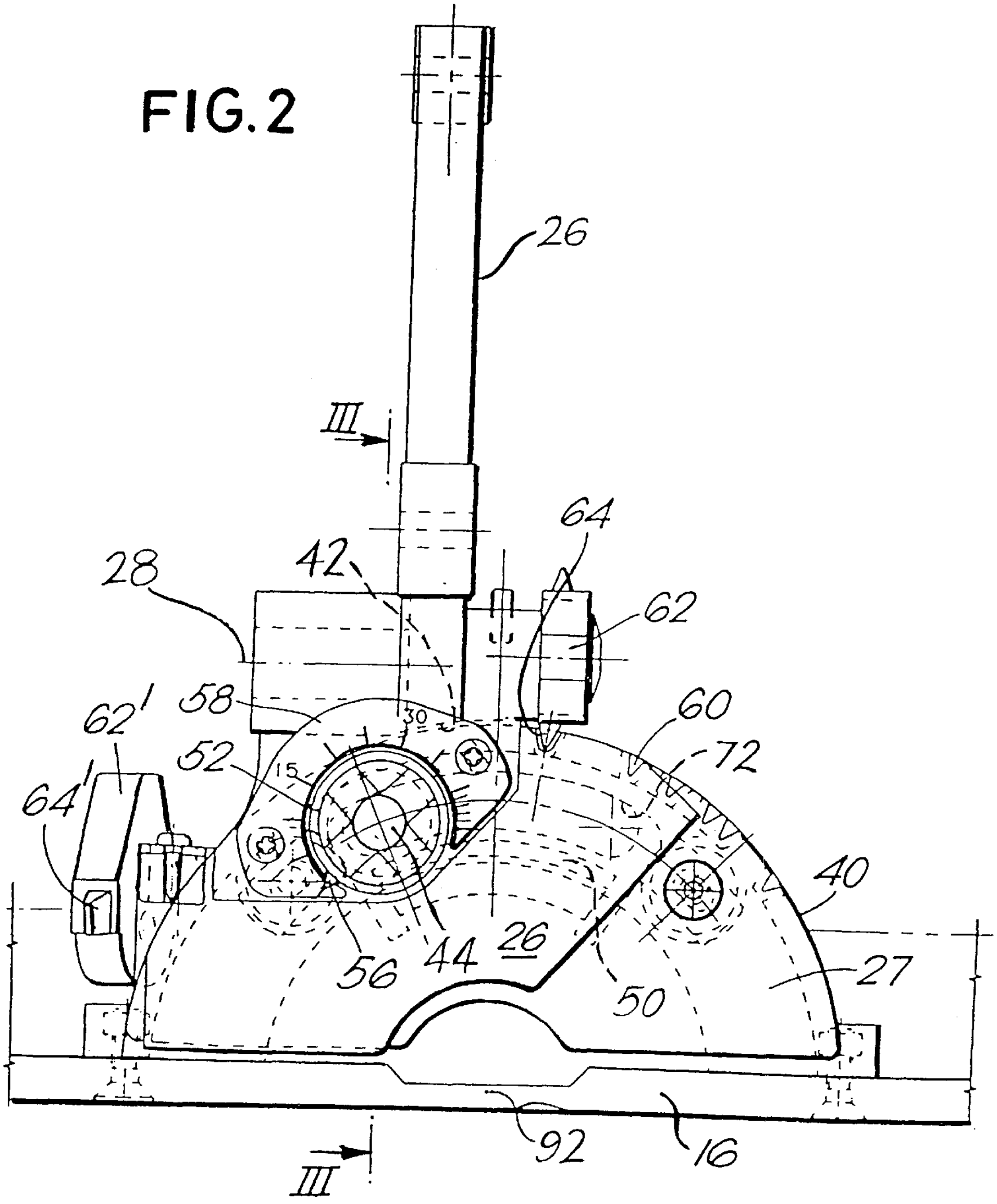
FIG. 2 is a rear view illustrating the positioning of the dial.

As can better be seen from FIG. 2, the sleeve 52 is provided with a pointer 56. Similarly, the pivot support 26 carries a bolted-on scale 58. Adjustment of the bevel angle of the saw 10, will therefore cause the pointer 56 to advance around the scale 58 and indicate the bevel angle which has been selected. Also illustrated in this figure is a latch arrangement between the pivot block 27 and pivot support 26. A plurality of notches 60 are formed in the outer surface 40 of the pivot block and the plate 46, and a toggle mechanism 62, carried by the pivot support 26 is provided with lugs 64 adapted to engage the notches 60. A similar toggle mechanism 62' is illustrated, this being used to latch the rotatable portion (not shown) of the table 16 so as to fix with accuracy the angle of a mitre cut.

As is clear from FIG. 2, the dial, comprising the pointer 56 and scale 58 faces away from the operator when the saw is used in chop saw mode. However, when the saw is inverted and used as a table saw, the dial will be facing towards the position where the operator is standing. The operator need merely watch the dial as he adjusts the bevel angle until the angle which he requires is shown.

In chop saw mode, a different bevel angle indicating scale is used by the user, but this is conventional. A notch 74 in a pivot guide 76 exposes a scale 78 on a front face of the pivot block 27. The pivot guide has a part cylindrical surface 80 on its underside which slides over a corresponding surface 82 of the pivot block. The scale 78 is easily visible in chop saw mode, but, of course, is very effectively hidden in bench saw mode. Hence the necessity for the gear arrangement described above.

It will of course be appreciated that the present invention has been described above purely by way of example and that modifications of detail may be made without departing from its scope.

What is claimed is:

1. A saw comprising:

a table having a plane;

a pivot block mounted on said table;

a pivot support pivotally mounted to said pivot block about a first axis parallel with the plane of said table;

a saw assembly mounted to said pivot support;

a saw blade occupying a plane substantially perpendicular to the plane of said table;

wherein the plane of said saw blade is generally vertical and the plane of said table is generally horizontal;

a gearing mechanism disposed between said pivot block and pivot support to indicate pivotal relationship between said pivot support and said pivot block about the first axis;

a pointer coupled to said gearing mechanism;

wherein pivotal movement of said pivot support to said pivot block effects a vertical angle of said saw blade to said table; and wherein said pointer indicates the vertical angle of said saw blade to said table.

2. The saw of claim 1, further comprising a scale mounted on said pivot block.

3. The saw of claim 1, further comprising a slot formed in said table through which the blade projects from below the table.

4. The saw of claim 1, wherein the saw is a table saw.

5. The saw of claim 1, wherein the saw is a chop saw.

6. The saw of claim 1, wherein the saw is a miter saw.

7. The saw of claim 1, wherein said gearing mechanism comprises:

an arcuate track disposed on said pivot block;

a pinion journalled in said pivot support; and said pointer is operatively connected to said pinion.

8. The saw of claim 7, wherein the pointer is disposed on said pinion.

9. A saw comprising:

a table;

a pivot block attached to said table;

a pivot support pivotally mounted to said pivot block;

a saw mounted to said pivot support;

a pin extending through and connecting together said pivot support to said pivot block, said pin having an axis;

a sleeve rotatably mounted on said pin;

a pointer formed in said sleeve;

a scale mounted to said pivot block and co-positioned with said pointer;

such that movement of said pivot support relative to said pivot block will cause said pointer to rotate about the axis of said pin and to re-position on said scale; and the position of said pointer on said scale represents bevel angle of said saw.

10. The saw of claim 9, further comprising:

a pinion formed at an end of said sleeve;

a rack connected to said pivot block; and wherein said pinion will advance along said rack and rotate relative to said pin when said pivot support moves relative to said pivot block.

11. The saw of claim 9, further comprising a slot formed in said table through which a blade projects from below the table.

12. The saw of claim 9, wherein the saw is a table saw.

13. The saw of claim 9, wherein the saw is a chop saw.

14. The saw of claim 9, wherein the saw is a miter saw.

* * * * *